Patented Mar. 16, 1954

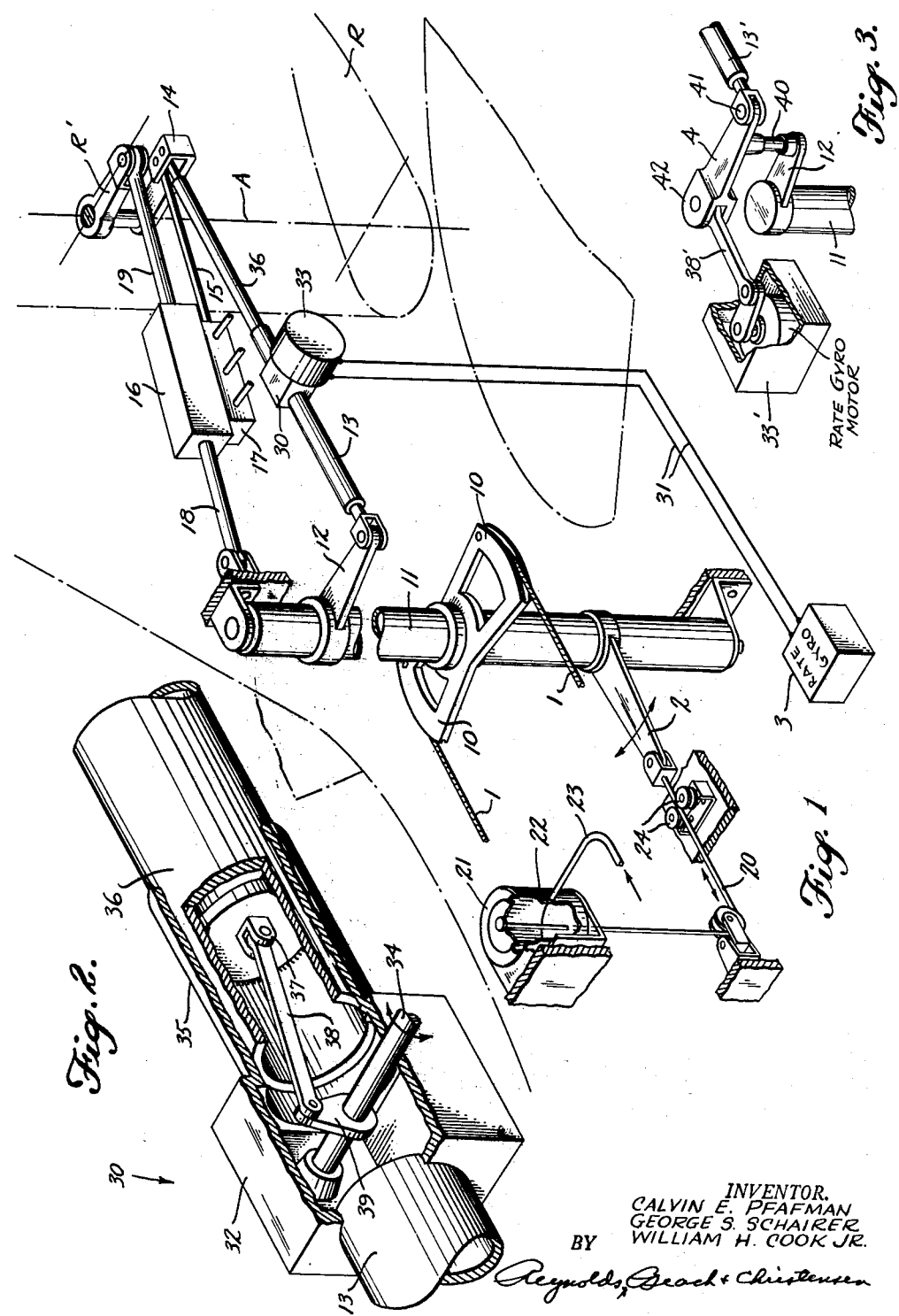

2,672,307

UNITED STATES PATENT OFFICE 2,672,307

AIRPLANE YAW DAMPER

William H. Cook, Jr., Bellevue, and Calvin E. Pfafman and George S. Schairer, Seattle, Wash., assignors to Boeing Airplane Company, Seattle, Wash., a corporation of Delaware Application October 9, 1950, Serial No. 189,254

8 Claims. (Cl. 244—76)

This invention relates to airplane flight control mechanisms, and more particularly to mechanisms for damping angular oscillation of an aircraft about one of its axes, such as the yaw of an airplane about its vertical axis.

No particular difficulty is usually experienced with oscillation of lightly loaded airplanes about an axis, because when yaw, for example, is produced by a side air gust on the vertical surfaces of the empennage, the inertia involved in the displacement of the airplane about the vertical axis is not very great. Moreover, such an airplane is readily responsive to movement of its controls, so that it can be restored to straight flight condition quickly and easily by the pilot. Consequently, there is little tendency for hunting to develop in restoring the airplane to straight flight position by pilot-operated movement of the rudder.

In large aircraft, particularly with heavy loads, on the contrary, when the empennage is angularly displaced by a gust of wind, it is frequently difficult for the pilot to detect such displacement immediately, particularly at high altitudes where reference to ground objects is largely lacking. As soon as the angular displacement of the airplane is noted, the pilot will, of course, move his controls to restore the airplane to straight flight, but such large airplanes are inherently less responsive to their controls, and consequently appreciable corrective action may be necessary.

Moreover, because of the inability of the pilot to feel promptly and accurately the angular movement of the airplane, such restorative movement of the control may be maintained long after the airplane has begun its angular restoring motion. Such continued restoring positioning of the control surface, together with the momentum resulting from the great mass of the airplane, will cause the airplane to be displaced to the opposite side of straight flight position instead of being brought substantially to straight flight position and there stabilized immediately. The pilot must thereupon reverse his controls and attempt to limit the swing of the airplane to the opposite side of its straight flight position. While the angular movement thus produced may be dynamically unstable, ordinarily it is not, but a considerable number of oscillations may occur before straight flight of the airplane is resumed.

It will be understood that such oscillation of the airplane, particularly in yaw, requires considerable exertion on the part of the pilot to correct, and in rough air extended effort of the pilot may be required to maintain the airplane on an approximately straight course as it is buffeted about, as compared with the duration of the effort which would be required for flying a light airplane. Also, the passengers, in the case of a transport airplane, who ordinarily are located aft of the angular displacement axes will have the continual unpleasant sensation in yaw of swaying from side to side almost continually.

The tendency of some airplanes to be angularly displaced in the manner discussed is particularly pronounced in yaw at slow speed where the damping effect of the vertical surfaces is less, and various proposals have been made to overcome this action. Such yawing tendency may or may not be accompanied by rolling of the airplane, but the yaw is the most pronounced component. Normally yaw stability is obtained by increasing as far as necessary the area of the vertical fin of the airplane, but it has been found that in large airplanes adequate yaw stability may require an excessively large fixed surface. Actually a point is reached where the increase in size effects relatively little improvement, if any, on the yaw stability because the excitation of the airplane yaw due to side gusts will increase proportional to the increase in size of the vertical tail surfaces. Thus while the damping from weathervane action may be greater, the area on which side gusts acts is also greater, so that the initial disturbing force is increased.

It is an object of the present invention to establish flight path stability of an aircraft without increasing unduly the size of the vertical fin, and specifically to obtain such control dynamically by appropriate controlling movement of a control surface or surfaces. Such control surface movement, however, will be effected automatically and will be timed with relation to the angular disturbance of the airplane, so as to effect restoration of straight flight most expeditiously.

It is a further object not only to effect such corrective movement of the control surface automatically, but in such a manner that the pilot will not even be aware of the action of the automatic damping mechanism.

In incorporating such automatic control mechanism in an aircraft control system, it is an object not to alter the control system in a manner which will change greatly the action of the pilot operated controls or the feel of flying the aircraft which the pilot would obtain if the present control were not utilized.

An additional object is to provide such mechanism which can be incorporated in the usual control system of a large aircraft with the least possible change in the arrangement of such system.

Still a further object is to provide control mechanism having the characteristics discussed which will be simple and yet reliable in operation, and allow normal pilot control should the control mechanism referred to herein become inoperative.

The present invention includes an angular displacement rate or angular velocity sensing device which controls control surface actuating mechanism incorporated in the pilot-operated portion of such mechanism in such a way that the control surface will be moved automatically to damp the oscillation of the aircraft without affecting the position of the pilot's control. The mechanism is particularly suitable for incorporation in a rudder control incorporating a power actuator, such as a hydraulic piston cylinder device, which is controlled by the pilot. The control of the present invention may be superimposed upon the control of such hydraulic power actuator by acting to lengthen or shorten a link in the control linkage of such actuator, for example. An advantage of such installation is that the corrective action occurs adjacent to the mechanism which moves the control surface directly so that there is a minimum of time lag and lost motion between the sensing of the airplane yaw and the occurrence of the corrective rudder movement.

Additional objects and advantages of the invention will be recognized in the following detailed description of the preferred type of installation shown in the accompanying drawings.

Figure 1 is a diagrammatic perspective view of an airplane rudder control installation incorporating the invention.

Figure 2 is an enlarged detail perspective view of the particular link-adjusting mechanism incorporated in the installation shown in Figure 1, parts being broken away to reveal internal structure.

Figure 3 is a diagrammatic perspective view of a different type of rudder control installation of the invention.

A control system for the rudder of a large airplane as a typical installation to which the present invention may be applied most readily, would include rudder control cables 1 extending forward to the pilot's rudder pedals, and having their rearward ends secured to quadrants 10 which are secured to the torque tube 11. On this tube is also secured an arm 12 which, when swung by rotation of the torque tube effected by differential movement of the control cables 1, will reciprocate lengthwise a link 13 having one end connected to the outer end of such arm.

Link 13 may be considered the direct control element for the power mechanism, and for this purpose its end remote from arm 12 is pivoted to an arm 14 journaled to swing freely about the axis A on which the rudder R swings. To this link is also pivoted the valve control rod 15 of conventional hydraulic power mechanism, including the piston and cylinder device 16 which carries the valve housing 17 having connected to it the hydraulic liquid supply and return connections shown. This hydraulic power mechanism is supported by its piston rod 18, which is pivotally connected to the stationary structure of the empennage and is connected by a rod 19 to the horn R' mounted rigidly on the rudder R or its torque tube concentric with the axis A. The pivot connection between rod 19 and horn R' is spaced the same distance from axis A as the pivot between rod 15 and arm 14. The lengths of rods 15 and 19 are such that when these pivots are disposed concentrically the valve will be in closed position relative to the hydraulic power mechanism.

It will be recognized that the hydraulic valve may be so designed that no appreciable force is required to move the valve rod 15 for controlling the hydraulic power mechanism 16. Consequently an artificial "feel" should be provided for the pilot to replace the resistance to movement of his rudder control which is usually supplied by the reaction to the aerodynamic load on the rudder transmitter back through the pilot-operated controls to the pilot. Such "feel" operated controls should be proportional both to the displacement of the rudder and to the speed of the airplane, because the faster the airplane is traveling the greater will be the aerodynamic load on the rudder for a given displacement from neutral.

Such "feel" is afforded by applying a force to the torque tube 11 of the pilot operated control means by the arm 2. To the swinging end of this arm is pivoted a tension member or cable 20 having its other end secured to a diaphragm 21, which may form one end of a container 22. The air in this container is subjected to pressure increasing as the speed of the airplane increases by provision of a conduit 23 connected to it and subjected to the impact head of the air stream moving relative to the airplane. The pressure thus produced exerts a tension force on the cable 20 which increases as the airspeed, and consequently the air pressure in chamber 22, increases. Such force exerted on the swinging end of arm 2 tends to maintain such arm in alignment with the portion of cable 20 at the side of guide rollers 24 remote from the arm.

As the torque tube 11 is turned by reciprocation of cables 1 effected by the pilot it shifts the swinging end of arm 2 toward one side or the other of guide rollers 24. Such movement will pull cable 20 to draw diaphragm 21 downward against the force of the air under pressure within container 22. The farther arm 2 is swung the longer will be the component of the tension in cable 20 transversely of the arm, resisting swinging of such arm and tending to restore it to its central position. The force thus exerted on the arm resisting its movement will be equal for a given angular displacement of the arm in whichever direction the arm swings from its neutral position. Such force must be overcome by the pilot in order to turn tube 11 farther, or, in fact, even to hold the tube in a position rotated from its neutral position.

As the pilot reciprocates cables 1 to turn torque tube 11, resistance to such movement will be produced in the manner described, and arm 12 will be swung to reciprocate link 13 for swinging the arm 14 about the rudder axis A. As mentioned previously, when the power mechanism 16 is not operating the pivot interconnecting valve rod 15 and arm 14 and the pivot between rod 19 and the rudder horn R' are in alignment, although the arm 14 and horn R' are rotatively independent. Swinging of arm 14 effected by reciprocation of link 13 will shift the pivot of valve rod 15 in one direction or the other out of registry with the pivot between arm 19 and rudder horn R', to move the valve of the hydraulic power mechanism 16 correspondingly relative to the ports controlled by it. By such valve movement liquid will be supplied to one end or the other of the hydraulic cylinder so that it will be moved relative to the piston and its anchored rod 18 to reciprocate rod 19 in a direction to move its pivot with the rudder horn toward alignment with the pivot between valve rod 15 and arm 14. When such movement of rod 19 has progressed sufficiently to bring these pivot axes again into alignment, the valve will have reached closed position and operation of the power mechanism will be interrupted until relative reciprocation between rods 15 and 19 recur.

The mechanism described thus far has been used heretofore without incorporation of the present invention in it and has been described in detail in order to make clear a type of control operating mechanism in which the present invention may advantageously be incorporated.

The elements added to the control operating mechanism described above in accordance with this invention include a yaw rate sensing device 3, link length adjusting mechanism 30 interposed in link 13, and an operative connection between the sensing device and the adjusting device which may take the form of an electrical position transmission mechanism including the wires 31. The sensing device 3 may incorporate known mechanism called a rate gyroscope, which senses the angular velocity of yaw and is designed to develop an electrical signal voltage proportional to the rate of yaw of the airplane. Such voltage is impressed upon the electrical position transmission mechanism or other electric operating connection, including wires 31, to the link length adjusting mechanism 30.

The internal structure of the link length adjusting mechanism is shown in greater detail in Figure 2. The link 13 carries directly the casing 32 which in turn carries the motor 33. This electric motor is of the reversible type, is connected to rotate shaft 34 extending transversely of link 13 through casing 32, and has controls operated by the electric rate gyro response transmitting mechanism. The motor will be energized by such controls to turn shaft 34 in one direction or the other in response to the voltage developed by the rate gyro.

A collar 35 at the side of casing 32 opposite link 13 slidably receives a sleeve 36 constituting the end of link 13 connected to arm 14. As will be evident from Figure 1, the slidable engagement between collar 35 and sleeve 36 is of considerable length to avoid any possibility of bending of these parts which would produce appreciable resistance to telescoping sliding of them.

The end of sleeve 36 received within collar 35, as shown in Figure 2, carries a clevis fitting 37 on a suitable mounting plate, to which is pivotally connected one end of a link 38. The other end of this link is pivoted to a crank 39 secured to the motor drive shaft 34. In Figure 2 this crank is shown in its central position corresponding to the adjusted length of link 13 establishing undeflected position of the rudder. Assuming that torque tube 11 remains stationary, as held by a centering device such as 22, shortening of the link 13 by rotation of crank 39 in a counterclockwise direction as seen in Figure 2 will result in the rudder R being swung to port. On the contrary, lengthening of link 13 by rotation of crank 39 in a clockwise direction as seen in Figure 2 will effect operation of the alternate mechanism to swing the rudder R to starboard.

The sensing device 3 may be located anywhere in the airplane, but preferably it is located near the center of gravity of the airplane, and wires 31 extend between such location and the link length adjusting mechanism. As long as the flight of the airplane is steady no voltage will be developed by the rate gyro, and consequently the length of link 13 will remain constant. As soon as an involuntary yaw is produced by a side gust of wind on the vertical surfaces of the empennage, causing the airplane to yaw, however, the rate gyro will develop a signal voltage to energize the motor 33 for turning shaft 34 and swinging crank 39. The amount of voltage developed by this action will depend upon the value of the yaw velocity thus produced.

Actually, even by the apparatus of this invention, the yaw ordinarily will not immediately be quelled completely, but an oscillatory movement of the tail of approximately simple harmonic type will occur. In such motion the angular velocity is greatest at the center of swing, and consequently at that time the voltage developed by the rate gyro 3 will likewise be greatest, causing the motor 33 to drive crank 39 farthest for varying the length of link 13 to the greatest extent at that position during the swing.

When during such yaw oscillations the movement of the tail of the airplane is to port, the gyro will energize motor 33 to swing link 39 in a counterclockwise direction for shortening link 13. Thus the rudder R will likewise be swung to port at the center of the swing, tending to retard such movement. As the velocity of the tail to port decreases the link 13 gradually will be lengthened so that by the time the tail reverses its direction of movement at the end of the swing to port the rudder will have returned to its center position.

As the swing of the rudder to starboard on the next portion of the oscillation cycle is initiated, swinging of the rudder to starboard relative to the vertical fin also begins. Deflection of the rudder increases progressively until the airplane reaches its center of swing, whereupon the deflection will gradually be reduced until the rudder again is centered when the tail has moved to its farthest position on the starboard side.

It will thus be seen that the length of the link 13 will be adjusted by the rate gyro 3 so that the restoring movement of rudder R leads the swing of the tail by approximately 90 degrees. This action automatically produces the greatest restoring force with no tendency to over-control, whereas the pilot would tend to overcontrol by manual actuation of the rudder moving control. Moreover, this damping action of the rudder is effected even though arm 12 remains stationary and the pilot's controls continue in their centered position. Preferably such automatic movement of the rudder is limited to an angular displacement of 5 degrees in each direction from centered position of the rudder. Such rudder deflection may be effected by lengthening or shortening of the link 13 less than one-half inch from its normal length assumed when arm 2 is in alignment with cable 20 and the rudder R is undeflected.

It will be understood that operation of the rate gyro effecting variation in length of link 13 does not at any time take control of the rudder actuating mechanism out of the hands of the pilot, and the pilot can overpower the yaw damper at any time. If desired, the sensitivity of the electrical system may be controlled by the pilot so that a smaller voltage is developed for a given angular velocity sensed by the rate gyro 3, or the effect on motor 33 of the voltage developed may be decreased, so that in either event less alteration in the length of link 13, and consequently a smaller deflection of the rudder, is produced for a given angular velocity of yaw sensed by the rate gyro device. Thus the rudder deflection may be varied from 0.3 to 1.3 degrees of rudder deflection for each degree per second of yaw velocity. It has been found that the damping effect is greatest, and consequently the flight characteristics best, when the mechanism is set for maximum sensitivity.

The installation shown in Figure 3 accomplishes the same function as that described heretofore but incorporates a different arrangement for varying the length of the link between the pilot's control and the control surface. Instead of using reciprocating link length adjusting mechanism, a lever arm 4 is interposed between the pilot's control torque tube 11 and the adjacent end of link 13' connected to the control surface. The arm 4 is mounted by a pivot pin 40 between its ends on the outer end of the arm 12 fixed to the torque tube 11. One end of this lever is connected by pivot 41 to the end of link 13', whereas the other end is connected by pivot 42 to the crank arm 38' of the motor 33'. As the motor 33' is actuated by signals from the rate gyro, the link 38' will be reciprocated in one direction or the other to swing arm 4 correspondingly. The resulting movement of pivot 41 will vary the effective length between pivot 40 on arm 12 and the connection of link 13 to the control surface operating power mechanism. It will be evident that the effect of varying the effective length of link 13' by swinging of arm 4 will be exactly the same as varying the length of link 13, 36, as described in connection with the other form of the invention.

When the airplane is turned voluntarily by the pilot it may be desirable to deenergize the automatic system or reduce its sensitivity so that the link 13 or 13' will not be varied in length, or will be changed to a lesser degree, contra to the movement of the rudder being effected by the pilot. While the pilot can move his controls far enough to overcome the effect of varying the length of linkage 13 or 4, 13', a greater movement of the pilot's controls for a given displacement of the rudder is required in one version of the present invention than in the normal installation, because in a voluntary turn the angular velocity or acceleration will react on the rate gyro 3 just as does an involuntary yaw, which will cause corresponding variation in the length of linkage 13 or 4, 13' in a direction tending to overcome the yaw being produced by a pilot-effected operation of the controls. Such disadvantage of requiring greater movement of the rudder controls by the pilot during maneuvering is, however, far more than offset by the stability secured in a large airplane by this invention during straight flight. In another version the electrical circuit associated with the rate gyro will transmit a control signal to the motor 33 or 33' only during oscillations or other transient motions, and will not move the motor once a steady turn of the airplane is established.

We claim as our invention:

1. Control mechanism for an airplane comprising a control surface, airplane structure supporting said control surface, power means operable to move said control surface, pilot-operated control means, interconnecting means connecting said pilot-operated control means and said power means, operable to effect control of said power means by movement of said pilot-operated control means, and including electric motor means operable to effect control of said power means while said pilot-operated control means remains stationary, and sensitive rate-of-angular-displacement sensing means operable to sense the rate of angular displacement of said airplane structure and further operable to energize said electric motor means to control said power means for effecting movement of said control surface while said pilot-operated control means are stationary.

2. The airplane control mechanism defined in claim 1, in which the control surface is a rudder, and the rate-of-angular-displacement sensing means is operable to sense yaw.

3. The airplane control mechanism defined in claim 1, in which the interconnecting means includes linkage, and the electric motor means is operable to alter the over-all length of said linkage for effecting movement of the control surface.

4. The airplane control mechanism defined in claim 1, in which the interconnecting means includes a telescoping link, and the electric motor means is operable to alter the length of said link for effecting movement of the control surface.

5. The airplane control mechanism defined in claim 1, in which the interconnecting means includes a lever arm and link connected together, and the electric motor means is operable to swing such arm for altering the over-all length of said lever and link combination for effecting movement of the control surface.

6. Airplane control mechanism as defined in claim 1, in which the rate of angular displacement sensing means is at rate gyroscope.

7. Control mechanism for an airplane comprising a swingable control surface, hydraulic power means including a control valve therefor, airplane structure supporting said control surface, means supporting said hydraulic power means from said airplane structure, means operatively connecting said hydraulic power means to said control surface to effect swinging thereof, pilot-operated control means, interconnecting means connected to said pilot-operated control means and including motion transmitting means connected to said hydraulic power means control valve and operable to effect control surface moving operation of said hydraulic power means by movement of said valve effected by said pilot-operated control means, and further including electric motor means operable to effect control surface moving operation of said hydraulic power means by movement of said valve while said pilot-operated control means remains stationary, and sensitive rate-of-angular-displacement sensing means operable to sense the rate of angular displacement of said airplane structure and further operable to energize said electric motor means for moving said hydraulic power means control valve to effect movement of said control surface by operation of said hydraulic power means while said pilot-operated control means remains stationary.

8. The airplane control mechanism defined in claim 7, in which the motion transmitting means includes linkage incorporating the electric motor means and the electric motor means is energizable to alter the length of said linkage for moving the hydraulic power means control valve while the pilot-operated control means remains stationary.

WILLIAM H. COOK, Jr.
CALVIN E. PFAFMAN.
GEORGE S. SCHAIRER.

References Cited in the file of this patent
UNITED STATES PATENTS

| Number | Name | Date |
|---|---|---|
| 2,234,326 | Tiebel | Mar. 11, 1941 |
| 2,373,575 | Lemonier | Apr. 10, 1945 |
| 2,445,343 | Tyra | July 20, 1948 |
| 2,559,817 | Ashkenas | July 10, 1951 |